United States Patent [19]

Kruke et al.

[11] 3,861,754

[45] Jan. 21, 1975

[54] INVERTING LIMITING RELAY VALVE WITH INTERLOCK

[75] Inventors: Edward J. Kruke; Roy E. Bartholomew, both of Elyria, Ohio

[73] Assignee: The Bendix Corporation, Elyria, Ohio

[22] Filed: Apr. 19, 1973

[21] Appl. No.: 352,789

[52] U.S. Cl. ............................................. 303/13
[51] Int. Cl. ........................................... B60t 15/16
[58] Field of Search .............. 303/13, 9, 7, 52, 6 C; 188/170

[56] References Cited
UNITED STATES PATENTS
3,429,621  2/1969  Bueler ................................. 303/13
3,504,946  4/1970  Valentine et al. ................... 303/13

*Primary Examiner*—Trygve M. Blix
*Assistant Examiner*—Charles E. Frankfort
*Attorney, Agent, or Firm*—Ken C. Decker; William N. Antonis

[57] ABSTRACT

For use in a fluid pressure braking system of the dual circuit type in which one circuit includes a spring applied fluid pressure released actuator, a valve operable to supply fluid pressure from a source to the actuator to move the latter to a brake released position and effective to cut off such supply when the actuator has been released, and the valve being operative to release fluid pressure from the actuator to graduate spring brake application thereof in accordance with fluid pressure supplied the other circuit, and a second valve controlled by fluid pressure from said source for preventing operation of the first mentioned valve so long as the fluid pressure is above a predetermined value.

7 Claims, 1 Drawing Figure

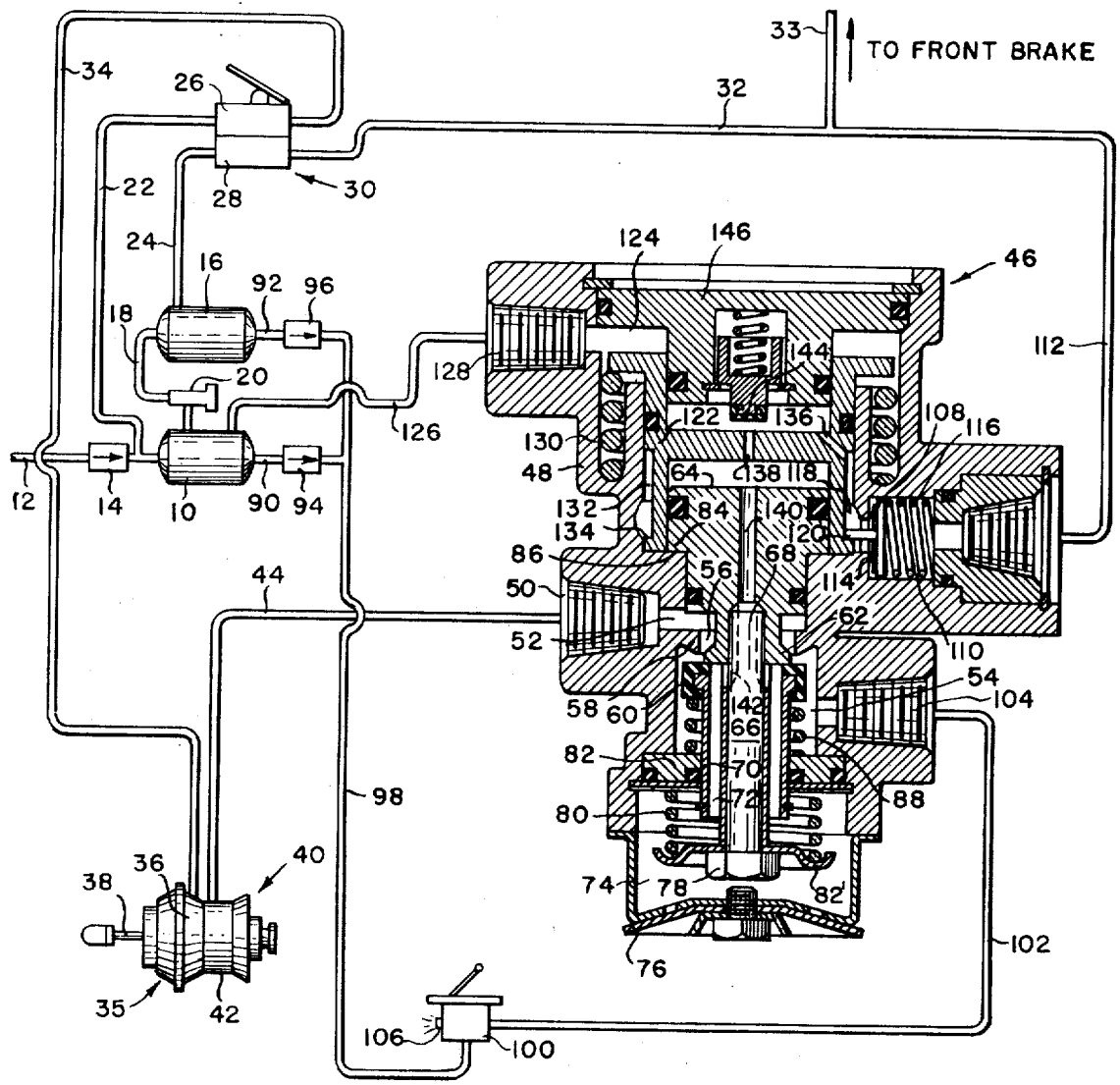

INVERTING LIMITING RELAY VALVE WITH INTERLOCK

DESCRIPTION OF THE INVENTION

This invention relates to valves for use in vehicle fluid pressure braking systems of the dual circuit type and more particularly to a valve for controlling spring applied fluid pressure released emergency brakes.

Spring applied fluid pressure released brakes are well known and in the conventional tandem actuator comprise a fluid pressure actuator for service application of the brakes together with the spring actuator which is normally maintained in a brake released position by fluid pressure but which is spring actuated, upon release of the fluid pressure, to apply the brakes through the service actuator. In some installations, automatic valve means are provided to release the fluid pressure when the service or emergency pressure falls to an unsafe low level, thus assuring a spring brake emergency application. In order to prevent abrupt application of the spring brakes to their fullest extent, it has been proposed to gradually release the pressure from the release chamber of the spring brake and the broad object of the present invention is to provide for use in a dual circuit brake system, a novel valve means which will automatically, upon a decrease in fluid pressure from the source to a predetermined low level, graduate or release the pressure from the spring brakes at a controlled rate so that a vehicle may be brought to a gradual stop.

Another object of the present invention is to provide in a dual circuit fluid pressure braking system of the foregoing character, a novel valve arrangement for controlling spring brake application in one circuit in accordance with the degree of brake application in the other circuit.

A further object is to provide a valve device of the above type which is so constructed that release of fluid pressure from the spring actuator is positively prevented until the pressure from the source drops to a predetermined low level.

Still another object is to provide a novel modulating relay valve of the above character which is positive in action, reliable in operation and includes relatively few parts which may be economically manufactured and assembled.

In the drawing, the single FIGURE diagrammatically illustrates a dual circuit fluid pressure braking system in connection with the novel modulating relay valve of the invention, the latter being shown in section.

Referring now to the drawing, the dual pressure braking system includes a primary reservoir 10 adapted to be supplied through a conduit 12 and one-way check valve 14 with compressed air from a conventional compressor (not shown), the reservoir 10 supplying fluid pressure to a secondary reservoir 16 by way of a conduit 18 and a conventional pressure regulating valve 20 which may be constructed as shown in the U.S. Pat. to Harry W. Valentine No. 3,236,256 dated Feb. 22, 1966. Reservoirs 10 and 16 have respective conduits 22, 24 connected with inlet cavities of upper and lower parts 26, 28 of a dual pressure brake valve 30 which may be of the type shown in the U.S. Pat. to George E. Ternent No. 3,580,646 dated May 25, 1971. As shown, the lower part 28 is connected through conduits 32, 33 with the front service brakes of a truck or trailer, while the upper part 26 is connected by conduit 34 to the rear service brakes 35 which include the usual brake chamber 36, push rod 38 and a tandemly mounted spring brake actuator 40 having a release chamber 42 to and from which fluid pressure is admitted and exhausted by way of a conduit 44 to control the spring brake.

The novel modulating relay valve 46 of the present invention is arranged to control the fluid pressure in the conduit 44 and hence in the release chamber 42 of the spring brake 40 and, as shown, such valve comprises a housing 48 provided with a delivery port 50 to which the conduit 44 is connected. Delivery port 50 communicates with a delivery cavity 52 in the housing 48 and the delivery cavity 52 is connected with an inlet cavity 54 through a central port 56 formed by a valve seat 58 engageable by a combined balanced inlet and exhaust valve 60 to disconnect the inlet and delivery cavities 54, 52. As shown, the valve 60 is also engageable by an exhaust valve element 62 carried by the lower portion of an emergency piston 64 slideably mounted in the housing 48. An elongated member 66 has its upper end 68 threadedly received within an opening in the piston 64, the member extending downwardly and spaced from a tubular member 70, carrying the valve 60, to define an exhaust passage 72 which communicates with an exhaust chamber 74 connected with the atmosphere through a conventional check valve seal 76. Member 66 is provided with a head 78 on its lower end and a spring 80 is confined between an abutment 82 carried by the lower portion of the housing 48 and a spring seat 82' in contact with the head 78, the tension of the spring being adjustable by adjusting the position of the member 66 with respect to the piston 64. It will be readily understood from this construction that the spring 80 is normally effective to move the emergency piston 64 downwardly in the housing 48 to a position where a stepped portion 84 on the piston engages a shoulder 86 in the housing 48 and in this position the valve element 62 engages the valve 60 to move it downwardly against the action of valve return spring 88 to cut off communication between the delivery cavity 52 and the exhaust passage 72 and establish communication between the delivery cavity 52 and the inlet cavity 54. In such condition of the valve fluid pressure may be conducted past the open valve 60 to the spring brake release chamber 42 from the inlet cavity 54. As shown, the latter may be supplied with fluid pressure from the reservoirs 10 and 16 by way of conduits 90, 92, one way check valves 94, 96, conduit 98, parking valve 100, conduit 102 and inlet port 104. Thus, when the parking valve 100 is moved to open position, the release chamber 42 of the spring brake actuator 40 is charged with fluid pressure to release the spring brake.

One of the features of the invention resides in limiting the pressure supplied to the release chamber 42 of the spring brake in order to avoid pressure build-up in the chamber above that required to activate the spring brake to released position. This is achieved by the emergency piston 64 and the association thereof with the valve 60. Thus, when the parking valve 100 is moved to open position as above described, fluid pressure in the delivery cavity 52 acting upon the lower surface of the emergency piston 64 will move the latter upwardly against the tension of the spring 80 until the valve 60 engages the valve seat 58 in order to prevent any further build-up of pressure within the spring brake release chamber. It will be understood that the spring 80 is adjusted to a position where the required release pressure will be conducted to the chamber 42 before closure of the valve 60. In this manner additional and unnecessary build-up of pressure in the spring brake release chamber is prevented.

From the foregoing, it will be seen that when the parking valve 100 is moved to its exhaust position to connect an exhaust opening 106 of the parking valve with the conduit 102, fluid pressure within the inlet cavity 54 will be exhausted through the opening 106 and the fluid pressure within the delivery cavity 52 acting upon the upper surface of the valve 60 will move the latter to its exhaust position to connect the delivery cavity and hence the spring brake release chamber 42 to the atmosphere by way of port 56, exhaust passage 72 and exhaust chamber 74. The spring brake will thus be fully applied for parking purposes.

Means are provided by the invention to modulate or graduate the release of fluid pressure from the spring brake release cavity 42 in order to allow a graduated application of the spring brake during certain conditions of operation of the dual brake system. As shown, such means includes a stem valve 108 positioned within an inlet chamber 110 formed in the upper portion of the valve housing 48, the said chamber being in constant communication with a conduit 112 which is connected with the conduits 32 and 33. Valve 108 is provided with a valve seat 114 which is normally urged by a spring 116 to the closed position illustrated in order to prevent communication between the inlet chamber 110 and an outlet chamber 118. The valve 108 is also provided with a stem 120 which when moved upwardly, in a manner which will appear more fully hereinafter, will cock or tilt the valve 108 to unseat the same and connect the chambers 110 and 118. When this occurs, fluid pressure from the conduit 112 will be effective on the stepped portion 84 of the piston 64 to move the latter upwardly so that the valve 60 is first closed against the seat 58 in order to interrupt communication between the inlet chamber 54 and the delivery chamber 52. Further increase of pressure within the chamber 118 will move the piston 64 a further distance upwardly in order to separate the exhaust valve element 62 from the valve 60 in order to connect the delivery chamber 52 and hence the spring brake release chamber 42 with the exhaust chamber 74 by way of port 56 and exhaust passage 72. Reduction of pressure within the release chamber 42 will accordingly enable spring brake application of the actuator 40 to be initiated. In the event the control pressure in the conduit 112 and hence in the outlet chamber 118 is maintained at a set value, it will be understood that as the pressure within the delivery chamber 52 is decreased to a predetermined value, the forces acting on the piston 64 will allow the latter to be moved to a lapped position, through the action of the spring 80, so that the valve element 62 will engage the valve 60 to interrupt any further exhaust of fluid pressure from the spring brake release chamber 42. Thus, an increase of the control pressure in chamber 118 effects a decrease in fluid pressure in the release chamber 42 thereby modulating the application of the spring brake actuator. In this manner, the spring brake operation in controlled and graduated by inversion of the control signal from the conduit 112.

In a system of the above-described type, it is highly desirable to avoid modulated application of the spring brake when the reservoir pressures are at their normal values so that the fluid pressure brake system may be operated in its intended manner. The invention accordingly provides a novel means for positively preventing the opening of the valve 108 so long as the reservoir pressure is within the range considered to be a safe operating pressure. When reservoir pressure drops to a value below the safe level however, the aforementioned means is effective to modulate the application of the spring brakes to enable braking of the vehicle notwithstanding the fact that available reservoir pressure may be insufficient to enable efficient vehicle braking through operation of the service brake actuators.

As shown, such means includes an interlock piston 122 positioned within the upper portion of the valve housing 48, an inlet chamber 124 being provided above the piston 122 for receiving fluid pressure directly from the primary reservoir 10 by way of conduit 126 and port 128. Fluid pressure within the chamber 128 acts on the top of piston 122 to move the latter downwardly against the action of a spring 130 to a position where the lower end of the piston 122 engages the shoulder 86. As shown, the piston 122 is provided with an annular cavity defining a chamber 132 within which the stem 120 is normally received and the piston is also provided with a lower annular flange 134 for effecting tilting movement of the stem 120 and valve 108 when the piston 122 is moved upwardly. Hence, when the fluid pressure in the primary reservoir is at a safe level, the piston 122 will remain in the position illustrated so that the valve 108 is closed and passage of fluid pressure to the chamber 118 from the conduit 112 to effect modulated spring brake application is prevented. However, should the primary reservoir pressure drop below a safe level, as for example of the order of 20-45 psi, the spring 130 will move the piston 122 upwardly and during such movement the flange 134 will tilt the valve 108 to open position. Thereafter, the modulated release of fluid pressure from the spring brake release chamber 42 in accordance with the control signal derived from the fluid pressure in the conduit 112 will occur as above described.

In addition to the foregoing, the invention provides a novel arrangement for preventing an undesired spring brake application in the event that any leakage of fluid pressure should occur past the normally closed valve 108. As shown, such arrangement includes passages 136, 138, 140 and 142 for connecting the chamber 118 and the exhaust passage 72. Hence any leakage past the valve 108 will be exhausted to atmosphere by way of the foregoing interconnected passages. A spring-closed valve 144 carried by a closure member 146 in the upper portion of the housing 48 is effective to close the connection between the passages 136 and 138 when the piston 122 moves upwardly when the reservoir pressure drops to the unsafe level above referred to.

In normal operation and with the reservoirs 10 and 16 charged with compressed air to normal value, the parking valve 100 is moved to open position in order to charge the release chamber 42 of the spring brake actuator 40 with fluid pressure from the reservoirs 10 and 16 by way of the open valve 60 which is moved off its seat 58 through the action of the spring 80. When the release chamber 42 has been charged to an extent sufficient to release the spring brakes, the emergency piston will be moved upwardly to allow valve 60 to close as above described. When it is desired to apply the service brakes of the vehicle, it is only necessary to manually operate the foot pedal of the dual circuit brake valve 30 to apply the rear service brake actuators 36 by connecting the primary reservoir 10 with the actuators 36 by way of conduit 22, upper part 26 of the brake valve and conduit 34. The front brake service actuators will be applied upon operation of the lower part 28 of the brake valve which serves to connect the front brake supply conduit 33 with the secondary reservoir 16 by way of conduits 24 and 32. At this time, the front brake control pressure will also be applied to the chamber 110 housing the control valve 108 which is maintained in closed position since the interlock piston 122 occupies the position shown in response to normal fluid pressure from the primary reservoir 10. Any leakage of fluid pressure past the control valve 108 will be exhausted to atmosphere by way of chamber 132 and interconnected passages 136, 138, 140, 142 and 72. This is the normal operation of the brake system and during movement of the brake valve 30, it will be understood that the rear and front brakes will be applied in a graduated and controlled manner depending upon the operation of the brake control valve 30. In the event however, that the fluid pressure in the primary reservoir 10 drops to a predetermined low level which would be insufficient to efficiently apply the rear service brake actuators 36, the present novel relay valve will automatically operate to modulate or graduate the release of fluid pressure from the spring brake release chambers 42 so that the spring brakes will be increasingly applied as the front brake service actuators are increasingly applied.

More particularly, when the fluid pressure from the primary reservoir 10 drops to the selected level, the interlock piston 122 will be moved upwardly, by the spring 130, to contact the valve 144 and thus cut off communication between the chamber 118 and the exhaust passage 72. The flange 134 at the lower portion of the interlocking piston 122 will also tilt the stem 120 and valve 108 to open the latter in order to supply fluid pressure from conduit 112, connected with the front brake service conduit 33, to the stepped portion 84 of the emergency piston 64. As heretofore described, the piston 64 will thereafter operate to modulate the reduction of fluid pressure in the release chamber 42 of the spring brake actuator 40 in accordance with the increase in the fluid pressure in the conduit 112. Hence, as the front brake service actuators are increasingly applied, the spring brake actuators 40 associated with the rear brakes will be increasingly applied so that the vehicle may be efficiently braked despite the drop in fluid pressure within the primary reservoir. It will be understood that any decrease in the control pressure in the conduit 112 will enable the emergency piston 64 to close the exhaust valve element 62 and open the valve 60 to recharge the spring brake release chambers 42 by fluid pressure available from the secondary reservoir 16 through conduit 102, open parking valve 100 and conduit 98. Thus, the valve 60 and emergency piston 64 effects an inversion of the control pressure from conduit 112 in the control of the fluid pressure within the spring brake release chambers in order to secure a modulated and graduated application and release of the spring brakes.

From the foregoing, it will be readily appreciated that the invention provides a spring brake modulating valve which enables a controlled application of the spring brakes in a situation where the available fluid pressure for brake operation has dropped to a relatively low unsafe level. In addition, the novel valve embodies a limiting feature which avoids the build-up of fluid pressure in the release chambers of the spring brakes beyond that required to release the spring brake. Furthermore, the invention provides a novel interlock system which positively assures that a spring brake application will not occur until the reservoir pressure has dropped to a predetermined low and unsafe level.

It will be apparent to those skilled in the art that the invention is susceptible of a variety of modifications without departing from the scope of the invention as determined by the appended claims.

What is claimed is:

1. For use in a fluid pressure braking system of the dual circuit type in which each circuit includes fluid pressure actuated brake chambers and one circuit also includes a spring applied fluid pressure released actuator, and a manually operable valve for controlling the application of fluid pressure from a source to said circuits, the invention which comprises a control valve for said actuator comprising a housing having inlet, delivery and exhaust ports adapted to be respectively connected to said source, said actuator and atmosphere, valve means in said housing for controlling said ports, a fluid pressure responsive element having a first motive area subjected at all times to the pressure at the delivery port and operatively connected to said valve means, said element being movable between a first position where said valve means connects said inlet and delivery ports and disconnects the latter from the exhaust port, a second lap position where said valve means disconnects said delivery port from said inlet and exhaust ports, and a third position where said valve means connects said delivery and exhaust ports while disconnecting the delivery port from the inlet port, resilient means acting on said element in opposition to the pressure at said delivery port, a modulation control port in said housing adapted to be connected with the other circuit of the braking system, an interlock control port in said housing adapted to be connected with said source, said fluid pressure responsive element having a second motive area connected with said modulation control port so that fluid pressure from said other circuit acts on said second motive area in opposition to said resilient means to move said element and valve means to said third position and relieve the pressure at said delivery port until the combined forces acting on said fluid pressure responsive element are overbalanced by said resilient means so that the valve means is moved to its second lap position, a valve for normally disconnecting the second motive area from the modulation control port, and a pressure responsive member in said housing constantly subjected to the pressure at said interlock control port and normally occupying a first position, resilient means for moving said member to a second position in response to a reduction in fluid pressure at said interlock control port to a predetermined value, and means actuated by movement of said member to the second position for opening said valve.

2. The control valve of claim 1 wherein said housing is provided with an outlet chamber connecting said modulation control port with said second motive area when said valve is open.

3. The control valve of claim 2 wherein said pressure responsive member is provided with an exhaust cavity connecting said outlet chamber and the exhaust port when said member occupies its first position.

4. The control valve of claim 3 which includes in addition, a valve device for closing the connection between the outlet chamber and the exhaust port when said pressure responsive member is moved to its second position.

5. The control valve of claim 4 wherein the pressure responsive member comprises a hollow piston and said fluid pressure responsive element is slideably mounted in said piston.

6. For use in a fluid pressure braking system of the dual circuit type in which one circuit includes a spring applied fluid pressure released actuator, and a manually operable valve for controlling the application of fluid pressure to said circuits, the invention which comprises valve means to supply fluid pressure from a source to said actuator to move the latter to a brake released position and to release fluid pressure from said actuator to graduate spring brake application thereof in accordance with fluid pressure supplied the other circuit, and means controlled by fluid pressure from the source for positively preventing fluid pressure release operation of said valve means so long as the fluid pressure from the source is above a predetermined value, said valve means including a movable part having a first motive area subject at all times to the fluid pressure in said actuator for cutting off the supply of fluid pressure to said actuator when the pressure therein has reached a predetermined value, said movable part including a second motive area subject to fluid pressure in said other circuit for modulating the release of fluid pressure from said actuator to graduate spring brake operation thereof, and a valve for controlling the application of fluid pressure from said other circuit to said second motive area, and resilient means for normally maintaining said valve in closed position so long as the fluid pressure from said source is above a predetermined value.

7. The control valve of claim 6 which includes in addition, a pressure responsive member subject at all times to the fluid pressure from said source and movable in one direction when said fluid pressure drops to a predetermined value, and means interconnecting said member and valve for moving the latter to open position to connect said other circuit to said second motive area when said member is moved in said one direction.

* * * * *